(12) United States Patent
Chung et al.

(10) Patent No.: US 10,952,301 B1
(45) Date of Patent: Mar. 16, 2021

(54) LIGHTING DEVICE FOR MULTIPLE INPUT VOLTAGES

(71) Applicant: PARAGON SEMICONDUCTOR LIGHTING TECHNOLOGY CO., LTD., New Taipei (TW)

(72) Inventors: Chia-Tin Chung, Miaoli County (TW); Pei-Chun Liu, New Taipei (TW)

(73) Assignee: PARAGON SEMICONDUCTOR LIGHTING TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/902,428

(22) Filed: Jun. 16, 2020

(30) Foreign Application Priority Data

Jan. 17, 2020 (TW) .................. 109200703

(51) Int. Cl.
*H05B 45/30* (2020.01)
*H05B 45/50* (2020.01)
*H05B 45/54* (2020.01)
*H05B 45/44* (2020.01)
*H05B 45/56* (2020.01)

(52) U.S. Cl.
CPC ............ *H05B 45/54* (2020.01); *H05B 45/44* (2020.01); *H05B 45/56* (2020.01)

(58) Field of Classification Search
CPC ........ H05B 45/00; H05B 45/44; H05B 45/50; H05B 45/54; H05B 45/56; H05B 47/24; H05B 47/02; H05B 45/30; H05B 45/37; H05B 47/25
See application file for complete search history.

(56) References Cited

U.S. PATENT DOCUMENTS

| | | | | |
|---|---|---|---|---|
| 2013/0049600 A1* | 2/2013 | Kim | ............... | H05B 45/37 315/122 |
| 2014/0312768 A1* | 10/2014 | Wu | ............... | H05B 45/48 315/85 |
| 2014/0354156 A1* | 12/2014 | Yang | ............... | H05B 45/37 315/122 |
| 2016/0050724 A1* | 2/2016 | Moon | ............... | H05B 45/37 315/200 R |
| 2019/0215919 A1* | 7/2019 | Fang | ............... | H02H 9/041 |

* cited by examiner

*Primary Examiner* — Thai Pham
(74) *Attorney, Agent, or Firm* — Li & Cai Intellectual Property (USA) Office

(57) ABSTRACT

A lighting device for multiple input voltages is provided. The lighting device for multiple input voltages includes a plurality of driving circuits each being electrically connected with the light-emitting unit. Each of the driving circuits receives an AC input voltage, and converts the AC input voltage into a working voltage for use by the light-emitting unit. Each of the driving circuits includes a surge protection device and a rectifier. The surge protection device inputs the AC input voltage. The rectifier is electrically connected with the surge protection device, and rectifies the AC input voltage into the working voltage through the surge protection device for use by the light-emitting unit. A threshold voltage of each of the surge protection devices to prevent a surge is different from each other, so that the AC input voltage received by the driving circuits are different from each other.

10 Claims, 6 Drawing Sheets

LIGHTING DEVICE FOR MULTIPLE INPUT VOLTAGES

CROSS-REFERENCE TO RELATED PATENT APPLICATION

This application claims the benefit of priority to Taiwan Patent Application No. 109200703, filed on Jan. 17, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a lighting device, and more particularly to a lighting device for alternating-current (AC) light emitting diodes (LEDs).

BACKGROUND OF THE DISCLOSURE

Existing lighting devices have been widely used in daily life. Since AC LEDs have the characteristics of not requiring power conversion, the importance of related lighting equipment using AC LEDs as the main light-emitting element have also increased.

Therefore, in order to effectively protect related electronic components of this type of lighting equipment, a surge protection device is generally provided on the circuit loop in the circuit design thereof. However, the selection of the threshold voltage of the surge protection device for anti high-voltage surge must be determined based on the AC input voltage, which currently also limits the voltage environment where the lighting device can be applied, which in turn prevents the lighting device from being widely applicable across different occasions.

SUMMARY OF THE DISCLOSURE

In response to the above-referenced technical inadequacies, the present disclosure provides a lighting device for multiple input voltages, which can be used for various AC input voltages.

In one aspect, the present disclosure provides a lighting device for multiple input voltages including a light-emitting unit and a plurality of driving circuits for emitting light. The light-emitting unit has a plurality of LED lamp strings. One of the LED lamp strings includes a plurality of AC LEDs. The plurality of driving circuits each is electrically connected with the light-emitting unit. One of the driving circuits receives an AC input voltage, and converts the AC input voltage into a working voltage for use by the light-emitting unit. Each of the driving circuits includes a surge protection device and a rectifier. The surge protection device is provided to input the AC input voltage. The rectifier is electrically connected with the surge protection device, and rectifies the AC input voltage through the surge protection device into the working voltage for use by the light-emitting unit. A threshold voltage provided by each of the surge protection devices of the driving circuits to prevent a surge is different from each other, so that the AC input voltages received by the driving circuits are different from each other.

Therefore, the lighting device for multiple input voltages inputs different AC input voltages to the corresponding driving circuits, so that each driving circuit provides corresponding anti-surge high-voltage protection for different AC input voltages. Accordingly, the present disclosure allows a single lighting device to be widely used in different input voltage environments, and effectively increases the utilization rate of lighting devices.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
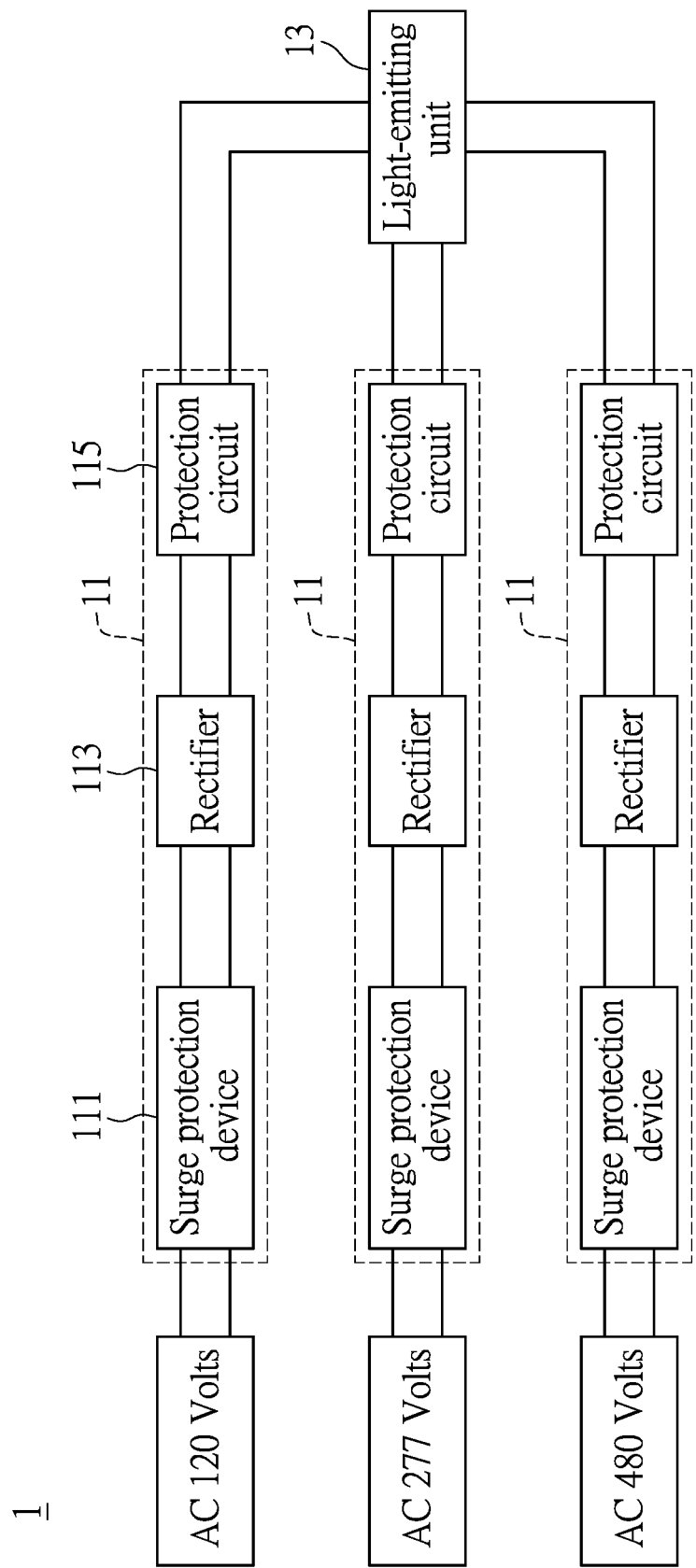
FIG. 1 is a function block diagram of a lighting device for multiple input voltages according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiment of the present disclosure provides a lighting device for multiple input voltages. The lighting device described herein is a light-emitting element that is an AC LED. In order to enable the lighting device to be used with different AC voltage inputs to adapt to different applications, a single circuit is provided for different AC input voltages on the circuit loop. Each single circuit provides circuit protection from surges and circuit operation issues. Furthermore, the same light-emitting element is shared between different circuit loops, thereby reducing the number and volume of elements.

[Embodiment of System Structure of Lighting Device for Multiple Input Voltages]

Referring to FIG. 1, FIG. 1 is a function block diagram of a lighting device for multiple input voltages according to an embodiment of the present disclosure. The lighting device for multiple input voltages 1 described in this embodiment includes, but is not limited to, a plurality of driving circuits 11 for emitting light and a light-emitting unit 13. The plurality of driving circuits 11 each is electrically connected with the light-emitting unit 13. The plurality of driving circuits 11 is provided to input different AC input voltages. For example, the plurality of driving circuits 11 are three groups of driving circuits 11 receive AC 120 volts, AC 277 volts, and AC 480 volts respectively, but are not limited to this. The light-emitting unit 13 is formed by multiple groups of LED lamp strings. Any group of LED lamp strings consists of a plurality of AC LEDs. The LED lamp strings are connected in series or in parallel with each other according to the actual circuit design, but are not limited to this.

Furthermore, each driving circuit 11 includes, for example, a surge protection device 111, a rectifier 113, and a protection circuit 115. The surge protection device 111 is electrically connected to the input terminal of the AC input voltage. The input terminal of the AC input voltage is a wire terminal or a connector, but the present disclosure is not limited to this. The rectifier 113 is electrically connected between the surge protection device 111 and the protection circuit 115. The rectifier 113 rectifies the AC input voltage through the surge protection device 111 to obtain a working voltage to be used by the light-emitting unit 13. The working voltage, for example, is a pulsating DC voltage. The rectifier 113, for example, is a bridge rectifier or a half-wave rectifier.

The protection circuit 115 is electrically connected between the rectifier 113 and the light-emitting unit 13. The protection circuit 115 provides circuit protection to the AC LEDs in the light-emitting unit 13. In an embodiment, the protection circuit 115 is any combination of an overcurrent protection circuit and an overheat protection circuit, but the present disclosure is not limited to this. The specific operation mode of the protection circuit 115 is known by those skilled in the art, and will not be described in detail herein.

In another embodiment, the driving circuit 11 can include only the surge protection device 111 and the rectifier 113, and the protection circuit 115 is omitted, so that the overall circuit cost and volume are reduced. Although the light-emitting unit 13 in this embodiment lacks the circuit protection provided by the protection circuit 115, the light-emitting unit 13 still normally obtains the working voltage from the output terminal of the rectifier 113 and lights up normally.

Furthermore, the high-voltage protection ranges provided by the surge protection device 111 in each driving circuit 11 against surges are different from each other. For example, the surge protection device 111 which receiving AC 120 volts provides a surge protection with a threshold voltage of 270 volts. The surge protection device 111 AC 277 volts provides a surge protection with a threshold voltage of 570 volts. The surge protection device 111 AC 480 volts provides a surge protection with a threshold voltage of 820 volts. In addition, the above-mentioned surge protection device 111 is a voltage suppressor or a metal oxide varistor (MOV), but the present disclosure is not limited to this. The above-mentioned threshold voltage, for example, is a breakdown voltage in an MOV.

Therefore, it is known from the above description that each of the surge protection devices 111 in the driving circuits 11 provides different threshold voltage for protection, so that each of the driving circuit 11 receives different AC input voltages. In other words, the user chooses one of the driving circuits 11 corresponding to the AC input voltage input according to the different AC input voltage provided by the installation position of the lighting device 1.

Figure 2:
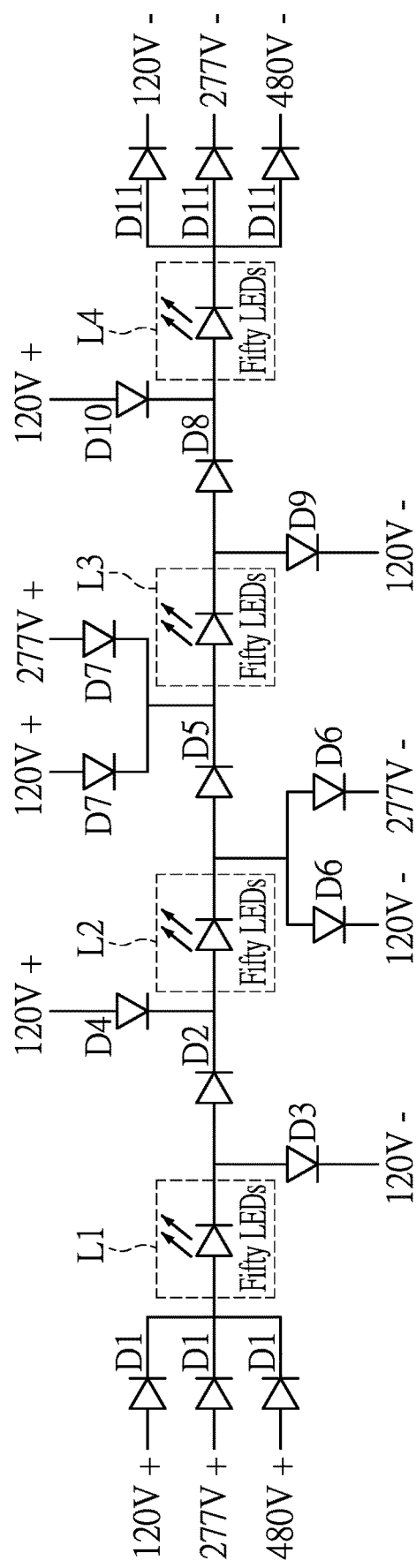
FIG. 2 is a schematic circuit diagram of a light-emitting unit according to the embodiment of the present disclosure.

Referring to FIG. 2, FIG. 2 is a schematic circuit diagram of a light-emitting unit according to the embodiment of the present disclosure. The light-emitting unit 13, for example, includes a plurality of LED lamp strings and a plurality of diodes, so that when the light-emitting unit 13 inputs AC input voltages of AC 120 volts, AC 277 volts, and AC 480 volts, a plurality of different power supply circuits are relatively provided, and at the same time, all of the LED lamp strings are in conducting state and illuminated.

As shown in FIG. 2, the LED lamp string, for example, includes a first LED lamp string L1, a second LED lamp string L2, a third LED lamp string L3, and a fourth LED lamp string L4. The LED lamp strings are connected by diodes in a manner as can be described in the following paragraph.

A first terminal of the first LED lamp string L1 is electrically connected to a plurality of first diodes D1 connected in parallel with each other. As shown in FIG. 2, the first diodes D1 are three diodes for example. A first terminal of the first diodes D1 is electrically connected to positive terminals of the power sources of AC 120 volts, AC 277 volts, and AC 480 volts.

A second diode D2 is connected in series between a second terminal of the first LED lamp string L1 and a first terminal of the second LED lamp string L2.

A first terminal of a third diode D3 is electrically connected between the second terminal of the first LED lamp string L1 and a first terminal of the second diode D2. A second terminal of the third diode D3 is electrically connected to a negative terminal of the power source of AC 120 volts.

A second terminal of a fourth diode D4 is electrically connected between the first terminal of the second LED lamp string L2 and a second terminal of the second diode D2. A first terminal of the fourth diode D4 is electrically connected to a positive terminal of the power source of AC 120 volts.

A fifth diode D5 is connected in series between a second terminal of the second LED lamp string L2 and a first terminal of the third LED lamp string L3.

Two first terminals of the sixth diodes D6 are parallel to each other and electrically connected to a second terminal of the second LED lamp string L2 and a first terminal of the fifth diode D5. Two second terminals of the sixth diodes D6 are respectively and electrically connected to the negative terminal of the power source of AC 120 volts and a negative terminal of the power source of AC 277 volts.

Two second terminals of the seventh diodes D7 are parallel each other to a first terminal of the third LED lamp string L3 and a second terminal of the fifth diode D5. A first terminal of the seventh diodes D7 is respectively and electrically connected to a positive terminal of the power source of AC 120 volts and a positive terminal of the power source of AC 277 volts.

An eighth diode D8 is connected in series between a second terminal of the third LED lamp string L3 and a first terminal of the fourth LED lamp string L4.

A first terminal of the ninth diode D9 is electrically connected between a second terminal of the third LED lamp string L3 and a first terminal of the eighth diode D8. A second terminal of the ninth diode D9 is electrically connected to the negative terminal of the power source of AC 120 volts.

A second terminal of the tenth diode D10 is electrically connected between a first terminal of the fourth LED lamp string L4 and a second terminal of the eighth diode D8. A first terminal of the tenth diode D10 is electrically connected to the positive terminal of the power source of AC 120 volts.

A second terminal of the fourth LED lamp string L4 is electrically connected to a plurality of first terminals of a plurality of eleventh diodes D11 which are parallel to each other. As shown in FIG. 2, the eleventh diodes D11 are three diodes for example. A plurality of second terminals of the eleventh diodes D11 are electrically connected to the negative terminals of the power sources of AC 120 volts, AC 277 volts, and AC 480 volts, respectively.

The first LED lamp string L1, the second LED lamp string L2, the third LED lamp string L3, and the fourth LED lamp string L4 are connected in series with fifty AC LEDs, respectively, as an example, but the present disclosure is not limited thereto.

Figure 3:
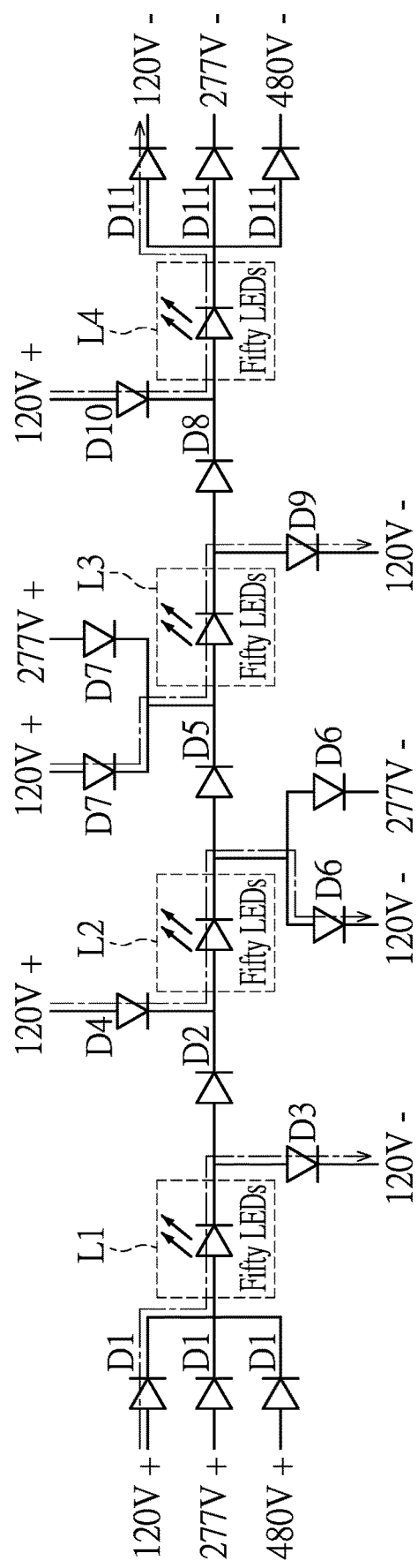
FIG. 3 to FIG. 5 are schematic diagrams of circuit conduction of the light-emitting unit according to FIG. 2.
Figure 4:
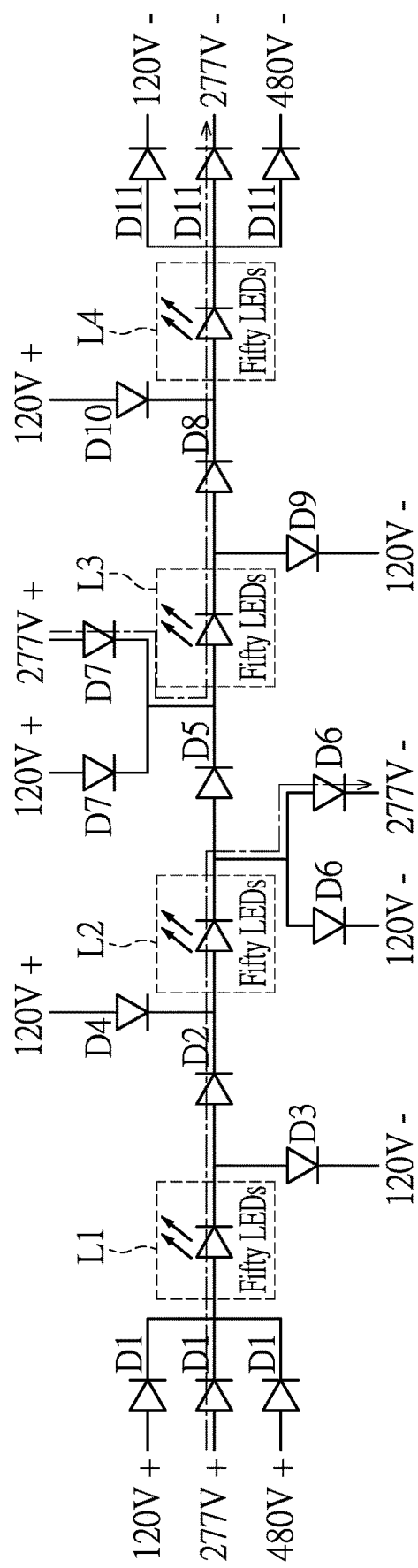
Figure 5:
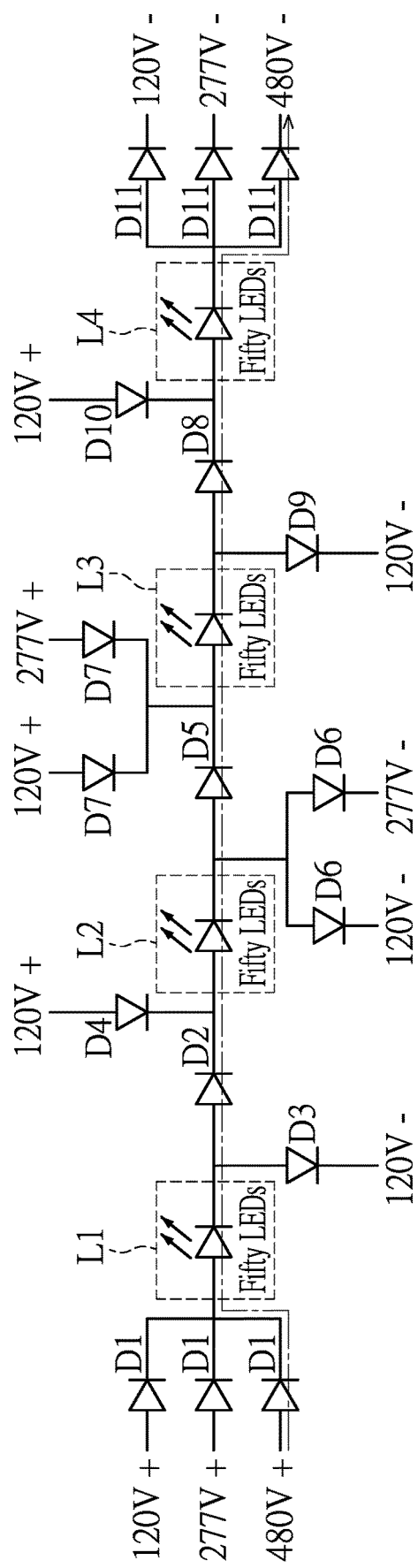

Referring to FIG. 3 to FIG. 5, FIG. 3 to FIG. 5 are schematic diagrams of circuit conduction of the light-emitting unit according to FIG. 2.

As shown in FIG. 3, after the light-emitting unit 13 receives a single AC input voltage of AC 120 volts, the conducting loop in which the current flows has four groups as follows.

In the first group of conduction loops, the current sequentially flows from the positive terminal of the power source of AC 120 volts through the first diodes D1, the first LED lamp string L1, the third diode D3 and the negative terminal of the power source of AC 120 volts.

In the second group of conduction loops, the current sequentially flows from the positive terminal of the power source of AC 120 volts through the fourth diode D4, the second LED lamp string L2, the sixth diodes D6, and the negative terminal of the power source of AC 120 volts.

In the third group of conduction loops, the current sequentially flows from the positive terminal of the power source of AC 120 volts through the seventh diodes D7, the third LED lamp string L3, the ninth diode D9, and the negative terminal of the power source of AC 120 volts.

In the fourth group of conduction loops, the current sequentially flows from the positive terminal of the power source of AC 120 volts through the tenth diode D10, the fourth LED lamp string L4, the eleventh diodes D11, and the negative terminal of the power source of AC 120 volts.

As shown in FIG. 4, after the light-emitting unit 13 receives a single AC input voltage of AC 277 volts, the conducting loop in which the current flows has two groups as follows.

In the first group of conduction loops, the current sequentially flows from the positive terminal of the power source of AC 277 volts through the first diodes D1, the first LED lamp string L1, the second diode D2, the second LED lamp string L2, the sixth diodes D6 and the negative terminal of the power source of AC 277 volts.

In the second group of conduction loops, the current sequentially flows from the positive terminal of the power source of AC 277 volts through the seventh diodes D7, the third LED lamp string L3, the eighth diode D8, the fourth LED lamp string L4, the eleventh diodes D11 and the negative terminal of the power source of AC 277 volts.

As shown in FIG. 5, after the light-emitting unit 13 receives a single AC input voltage of AC 480 volts, the conducting loop in which the current flows has one group as follows. In this conduction loop, the current sequentially flows from the positive terminal of the power source of AC 480 volts through the first diodes D1, the first LED lamp string L1, the second diode D2, the second LED lamp string L2, the fifth diode D5, the third LED lamp string L3, the eighth diode D8, the fourth LED lamp string L4, the eleventh diodes D11 and the negative terminal of the power source of AC 480 volts.

Figure 6:
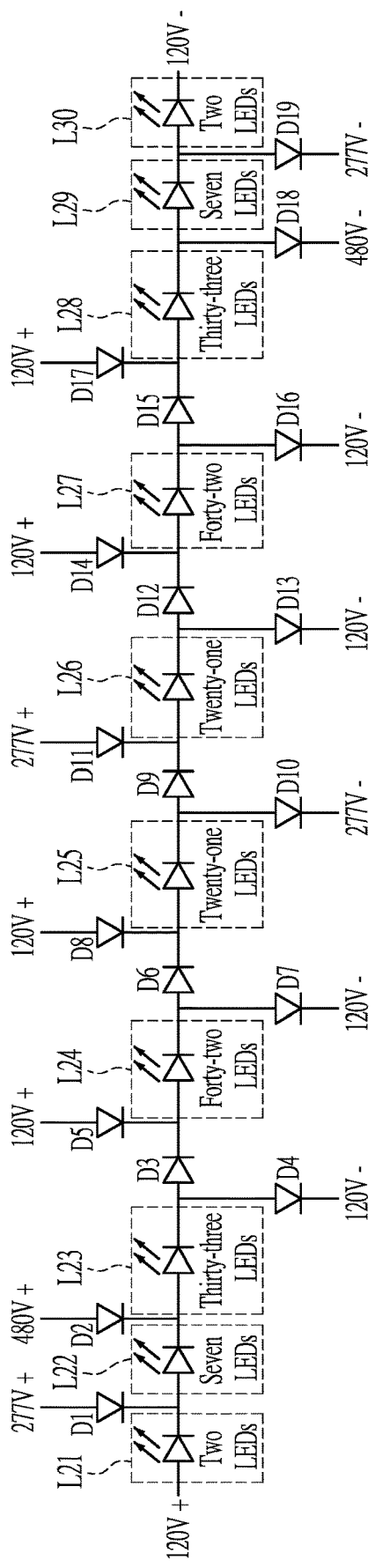
FIG. 6 is a schematic circuit diagram of a light-emitting unit according to an embodiment of the present disclosure.

Referring to FIG. 6, FIG. 6 is a schematic circuit diagram of a light-emitting unit according to an embodiment of the present disclosure. The light-emitting unit 13, for example, includes a plurality of LED lamp strings and a plurality of diodes, so that when the light-emitting unit 13 receives AC input voltages of AC 120 volts, AC 277 volts, and AC 480 volts, a plurality of different power supply circuits are relatively provided, and at the same time, all or part of the LED lamp strings are in conducting state and illuminated.

As shown in FIG. 6, the LED lamp string, for example, includes a first LED lamp string L21, a second LED lamp string L22, a third LED lamp string L23, and a fourth LED lamp string L24, a fifth LED lamp string L25, a sixth LED lamp string L26, a seventh LED lamp string L27, a eighth LED lamp string L28, a ninth LED lamp string L29 and a tenth LED lamp string L30. A method to connect the LED lamp strings by diodes refers to the following description.

A second terminal of the first diodes D1 is electrically connected between the first LED lamp string L21 and the second LED lamp string L22. A first terminal of the first LED lamp string L21 is electrically connected to a positive terminal of the power source of AC 120 volts. A first terminal of the first diodes D1 is electrically connected to a positive terminal of the power source of AC 277 volts.

A second terminal of the second diode D2 is electrically connected between the second LED lamp string L22 and the third LED lamp string L23. A first terminal of the second diode D2 is electrically connected to a positive terminal of the power source of AC 480 volts.

A third diode D3 is electrically connected between the third LED lamp string L23 and the fourth LED lamp string L24.

A first terminal of the fourth diode D4 is electrically connected between a second terminal of the third LED lamp string L23 and a first terminal of the third diode D3. A second terminal of the fourth diode D4 is electrically connected to a negative terminal of the power source of AC 120 volts.

A second terminal of the fifth diode D5 is electrically connected between a first terminal of the fourth LED lamp string L24 and a second terminal of the third diode D3. A first terminal of the fifth diode D5 is electrically connected to a positive terminal of the power source of AC 120 volts.

A sixth diodes D6 is electrically connected between the fourth LED lamp string L24 and the fifth LED lamp string L25.

A first terminal of the seventh diodes D7 is electrically connected between a second terminal of the fourth LED lamp string L24 and a first terminal of the sixth diodes D6. A second terminal of the seventh diodes D7 is electrically connected to a negative terminal of the power source of AC 120 volts.

A second terminal of the eighth diode D8 is electrically connected between a first terminal of the fifth LED lamp string L25 and a second terminal of the sixth diodes D6. A first terminal of the eighth diode D8 is electrically connected to a positive terminal of the power source of AC 120 volts.

A ninth diode D9 is electrically connected between the fifth LED lamp string L25 and the sixth LED lamp string L26.

A first terminal of the tenth diode D10 is electrically connected between a second terminal of the fifth LED lamp string L25 and a first terminal of the ninth diode D9. A second terminal of the tenth diode D10 is electrically connected to a negative terminal of the power source of AC 277 volts.

A second terminal of the eleventh diodes D11 is electrically connected between a first terminal of the sixth LED lamp string L26 and a second terminal of the ninth diode D9. A first terminal of the eleventh diodes D11 is electrically connected to a positive terminal of the power source of AC 277 volts.

A twelfth diode D12 is electrically connected between the sixth LED lamp string L26 and the seventh LED lamp string L27.

A first terminal of the thirteenth diode D13 is electrically connected between a second terminal of the sixth LED lamp string L26 and a first terminal of the twelfth diode D12. A second terminal of the thirteenth diode D13 is electrically connected to a negative terminal of the power source of AC 120 volts.

A second terminal of the fourteenth diode D14 is electrically connected between a first terminal of the seventh LED lamp string L27 and a second terminal of the twelfth diode D12. A first terminal of the fourteenth diode D14 is electrically connected to a positive terminal of the power source of AC 120 volts.

A fifteenth diode D15 is electrically connected between the seventh LED lamp string L27 and the eighth LED lamp string L28.

A first terminal of the sixteenth diode D16 is electrically connected between a second terminal of the seventh LED lamp string L27 and a first terminal of the fifteenth diode D15. A second terminal of the sixteenth diode D16 is electrically connected to a negative terminal of the power source of AC 120 volts.

A second terminal of the seventeenth diode D17 is electrically connected between a first terminal of the eighth LED lamp string L28 and a second terminal of the fifteenth diode D15. A first terminal of the seventeenth diode D17 is electrically connected to a positive terminal of the power source of AC 120 volts.

A first terminal of the eighteenth diode D18 is electrically connected between the eighth LED lamp string L28 and the ninth LED lamp string L29. A second terminal of the eighteenth diode D18 is electrically connected to a negative terminal of the power source of AC 480 volts.

A first terminal of the nineteenth diode D19 is electrically connected between the ninth LED lamp string L29 and the tenth LED lamp string L30. A second terminal of the nineteenth diode D19 is electrically connected to a negative terminal of the power source of AC 277 volts.

The first LED lamp string L21 and the tenth LED lamp string L30 are formed by connecting two LEDs in series. The second LED lamp string L22 and the ninth LED lamp string L29 are formed by connecting seven LEDs in series. The third LED lamp string L23 and the eighth LED lamp string L28 are formed by connecting thirty-three LEDs in series. The fourth LED lamp string L24 and the seventh LED lamp string L27 are formed by connecting forty-two LEDs in series. The fifth LED lamp string L25 and the sixth LED lamp string L26 are formed by connecting twenty-one LEDs in series. The connection method of each LED lamp string shown in FIG. 6 is only an example, and is not to limit the disclosure.

Figure 7:
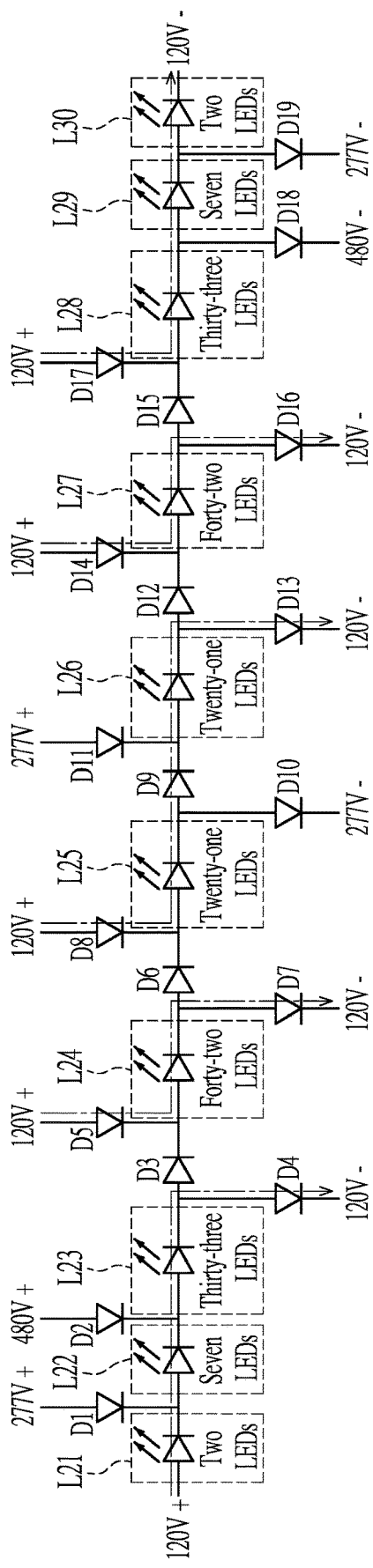
FIG. 7 to FIG. 9 are schematic diagrams of circuit conduction of the light-emitting unit according to FIG. 6.
Figure 8:
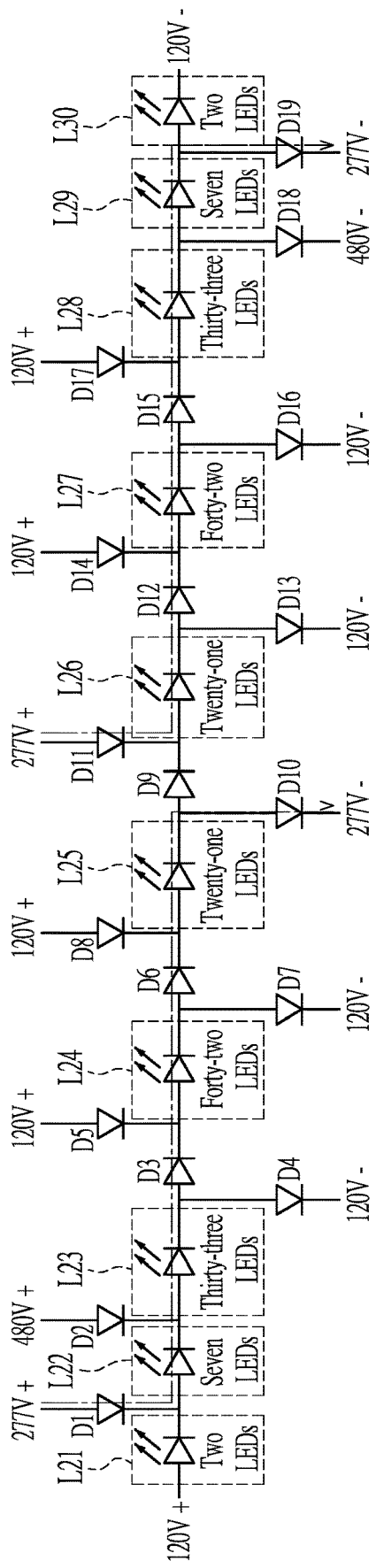
Figure 9:
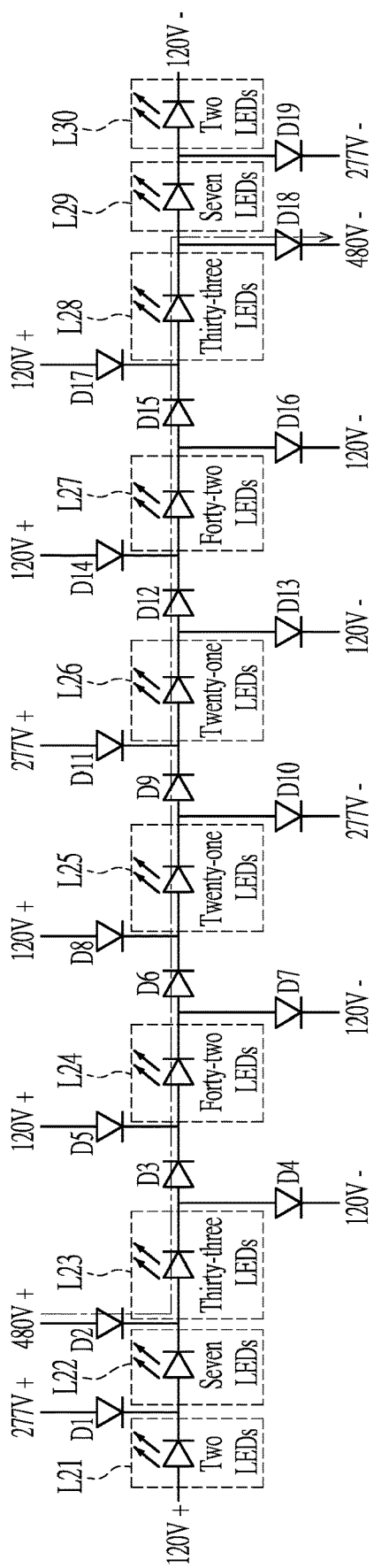

Referring to FIG. 7 to FIG. 9, FIG. 7 to FIG. 9 are schematic diagrams of circuit conduction of the light-emitting unit according to FIG. 6.

As shown in FIG. 7, after the light-emitting unit 13 receives a single AC input voltage of AC 120 volts, the conducting loop in which the current flows has five groups as follows.

In the first group of conduction loops, the current sequentially flows from the positive terminal of the power source of AC 120 volts through the first LED lamp string L21, the second LED lamp string L22, the third LED lamp string L23, the fourth diode D4 and the negative terminal of the power source of AC 120 volts.

In the second group of conduction loops, the current sequentially flows from the positive terminal of the power source of AC 120 volts through the fifth diode D5, the fourth LED lamp string L24, the seventh diodes D7, and the negative terminal of the power source of AC 120 volts.

In the third group of conduction loops, the current sequentially flows from the positive terminal of the power source of AC 120 volts through the eighth diode D8, the fifth LED lamp string L25, the ninth diode D9, the thirteenth diode D13 and the negative terminal of the power source of AC 120 volts.

In the fourth group of conduction loops, the current sequentially flows from the positive terminal of the power source of AC 120 volts through the fourteenth diode D14, the seventh LED lamp string L27, the sixteenth diode D16, and the negative terminal of the power source of AC 120 volts.

In the fifth group of conduction loops, the current sequentially flows from the positive terminal of the power source of AC 120 volts through the seventeenth diode D17, the eighth LED lamp string L28, the ninth LED lamp string L29, the tenth diode L30, and the negative terminal of the power source of AC 120 volts.

As shown in FIG. 8, after the light-emitting unit 13 receives a single AC input voltage of AC 277 volts, the conducting loop in which the current flows has two groups as follows.

In the first group of conduction loops, the current sequentially flows from the positive terminal of the power source of AC 277 volts through the first diodes D1, the second LED lamp string L22, the third LED lamp string L23, the third diode D3, the fourth LED lamp string L24, the sixth diodes D6, the fifth LED lamp string L25, the tenth diode D10 and the negative terminal of the power source of AC 277 volts.

In the second group of conduction loops, the current sequentially flows from the positive terminal of the power source of AC 277 volts through the eleventh diodes D11, the sixth LED lamp string L26, the twelfth diode D12, the seventh LED lamp string L27, the fifteenth diode D15, the eighth LED lamp string L28, the ninth LED lamp string L29, the nineteenth diode D19 and the negative terminal of the power source of AC 277 volts.

As shown in FIG. 9, after the light-emitting unit 13 receives a single AC input voltage of AC 480 volts, the conducting loop in which the current flows has one group as follows. In this conduction loop, the current sequentially flows from the positive terminal of the power source of AC 480 volts through the second diode D2, the third LED lamp string L23, the third diode D3, the fourth LED lamp string L24, the sixth diodes D6, the fifth LED lamp string L25, the ninth diode D9, the sixth LED lamp string L26, the twelfth diode D12, the seventh LED lamp string L27, the fifteenth diode D15, the eighth LED lamp string L28, the eighteenth diode D18, and the negative terminal of the power source of AC 480 volts.

Figure 10:
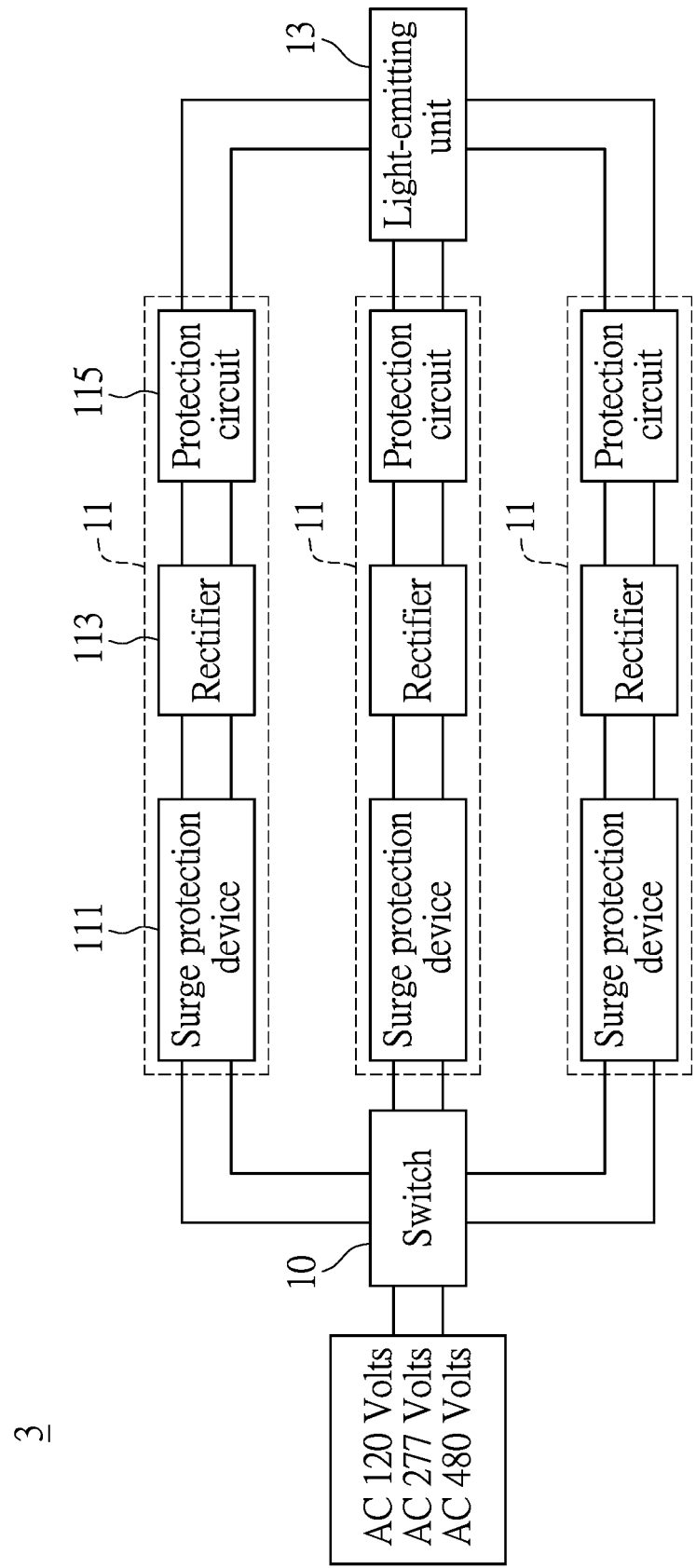
FIG. 10 is a function block diagram of a lighting device for multiple input voltages according to an embodiment of the present disclosure.

Referring to FIG. 10, FIG. 10 is a function block diagram of a lighting device for multiple input voltages according to an embodiment of the present disclosure. Compared with the lighting device 1 of FIG. 1, the lighting device 3 shown in FIG. 10 is provided with a switch 10, while the remaining components with the same component symbols have been described above, and are not repeated herein. The switch 10 is electrically connected with the surge protection device 111 of each of the driving circuits 11. The switch 10 is mainly used to selectively output an AC input voltage to one of the driving circuits 11 after receiving an AC input voltage. Further, the switch 10 is a slide switch or a toggle switch. For example, FIG. 10 shows an example of a double pole, triple throw (2P3T) slide switch, but the present disclosure is not limited to this. Therefore, for the lighting device 3 shown in FIG. 10, the user selectively input one of three different AC input voltages, such as AC120 volts, AC277 volts, and AC480 volts, to the switch at the input terminal of the switch 10 according to actual requirements. The switch 10 is manually operated to output an AC input voltage to the corresponding surge protection device 111. For example, after the switch 10 receives an AC input voltage of AC 120 volts, the user must switch the output of the switch 10 to the surge protection device 111 that provides a threshold voltage of 270 volts. After the switch 10 receives an AC input voltage of AC 277 volts, the user must switch the output of the switch 10 to the surge protection device 111 that provides a threshold voltage of 510 volts. After the switch 10 receives an AC input voltage of AC 480 volts, the user must switch the output of the switch 10 to the surge protection device 111 that provide a threshold voltage of 820 volts. Therefore, the switching selection of the switch 10 facilitates personnel to select the driving circuit 11 that is applicable to the current AC input voltage.

In conclusion, the lighting device provided by the present disclosure supports a variety of input voltages, and receives different AC input voltages through multiple groups of independent driving circuits. The lighting device is disposed corresponding to AC input voltages in the respective driving circuits. The surge protection devices enable the same lighting device to be applied to different AC input voltages for use, and the light-emitting unit is shared by each driving circuit to reduce the number of components and achieve a volume reduction effect. In addition, while normally providing illumination, the light-emitting unit in the lighting device can simultaneously provide a surge circuit protection effect. Therefore, the lighting device of the present disclosure is widely and flexibly applied to different AC input voltage environments, thereby effectively improving product use efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A lighting device for multiple input voltages, comprising:
   a light-emitting unit, which has a plurality of light emitting diode (LED) lamp strings, one of the LED lamp strings including a plurality of alternating-current (AC) LEDs; and
   a plurality of driving circuits for emitting light, each being electrically connected with the light-emitting unit, wherein one of the driving circuits receives an AC input voltage different from other AC input voltages, converting the AC input voltage into a working voltage for use by the light-emitting unit;
   wherein each of the driving circuits includes:
      a surge protection device for inputting the AC input voltage; and
      a rectifier being electrically connected with the surge protection device, and rectifying the AC input voltage into the working voltage through the surge protection device for use by the light-emitting unit;
   wherein a threshold voltage provided by each of the surge protection devices of the driving circuits to prevent a surge is different from each other, so that the AC input voltage received by the driving circuits are different from each other, and the high-voltage protection ranges provided by the surge protection device in each of the driving circuits against surges are different from each other.

2. The lighting device for multiple input voltages according to claim 1, wherein the driving circuit further includes a protection circuit being electrically connected between the rectifier and the light-emitting unit.

3. The lighting device for multiple input voltages according to claim 2, wherein the protection circuit is one or a combination of overcurrent protection circuits or overheat protection circuits.

4. The lighting device for multiple input voltages according to claim 3, wherein the surge protection device is a voltage suppressor or a metal oxide varistor.

5. The lighting device for multiple input voltages according to claim 2, further comprising a switch being electrically connected with the driving circuits, wherein the switch receives the AC input voltage and selectively outputs the AC input voltage to one of the driving circuits.

6. The lighting device for multiple input voltages according to claim 5, wherein the switch is a slide switch or a toggle switch.

7. The lighting device for multiple input voltages according to claim 1, wherein the AC input voltage received by the driving circuits is 120 volts, 277 volts, and 480 volts.

8. The lighting device for multiple input voltages according to claim 7, wherein the surge protection devices have a threshold voltage of 270 volts, a threshold voltage of 510 volts, and a threshold voltage of 820 volts.

9. The lighting device for multiple input voltages according to claim 8, wherein the LED lamp strings including a first LED lamp string, a second LED lamp string, a third LED lamp string and a fourth LED lamp string;
- wherein a first terminal of the first LED lamp string is electrically connected to a plurality of first diodes connected in parallel with each other;
- wherein a second diode is connected in series between a second terminal of the first LED lamp string and a first terminal of the second LED lamp string;
- wherein a third diode is electrically connected between the second terminal of the first LED lamp string and the second diode;
- wherein a fourth diode is electrically connected between the first terminal of the second LED lamp string and the second diode;
- wherein a fifth diode is connected in series between a second terminal of the second LED lamp string and a first terminal of the third LED lamp string;
- wherein the second terminal of the second LED lamp string and the fifth diode are electrically connected to a plurality of sixth diodes connected in parallel with each other;
- wherein the first terminal of the third LED lamp string and the fifth diode are electrically connected to a plurality of seventh diodes connected in parallel with each other;
- wherein an eighth diode is connected in series between a second terminal of the third LED lamp string and a first terminal of the fourth LED lamp string;
- wherein a ninth diode is electrically connected between the second terminal of the third LED lamp string and the eighth diode;
- wherein a tenth diode is electrically connected between the first terminal of the fourth LED lamp string and the eighth diode;
- wherein a second terminal of the fourth LED lamp string is electrically connected to a plurality of eleventh diodes connected in parallel with each other; and
- wherein the first LED lamp string, the second LED lamp string, the third LED lamp string, and the fourth LED lamp string are each formed by connecting the fifty of the AC LEDs in series.

10. The lighting device for multiple input voltages according to claim 8, wherein the LED lamp strings including a first LED lamp string, a second LED lamp string, a third LED lamp string, a fourth LED lamp string, a fifth LED lamp string, a sixth LED lamp string, a seventh LED lamp string, an eighth LED lamp string, a ninth LED lamp string and a tenth LED lamp string;
- wherein a first diode is electrically connected between the first LED lamp string and the second LED lamp string;
- wherein a second diode is electrically connected between the second LED lamp string and the third LED lamp string;
- wherein a third diode is electrically connected in series between the third LED lamp string and the fourth LED lamp string;
- wherein a fourth diode is electrically connected between the third LED lamp string and the third diode;
- wherein a fifth diode is electrically connected between the fourth LED lamp string and the third diode;
- wherein a sixth diode is electrically connected in series between the fourth LED lamp string and the fifth LED lamp string;
- wherein a seventh diode is electrically connected between the fourth LED lamp string and the sixth diode;
- wherein an eighth diode is electrically connected between the fifth LED lamp string and the sixth diode;
- wherein a ninth diode is electrically connected in series between the fifth LED lamp string and the sixth LED lamp string;
- wherein a tenth diode is electrically connected between the fifth LED lamp string and the ninth diode;
- wherein a eleventh diode is electrically connected between the sixth LED lamp string and the ninth diode;
- wherein a twelfth diode is electrically connected in series between the sixth LED lamp string and the seventh LED lamp string;
- wherein a thirteenth diode is electrically connected between the sixth LED lamp string and the twelfth diode;
- wherein a fourteenth diode is electrically connected between the seventh LED lamp string and the twelfth diode;
- wherein a fifteenth diode is electrically connected in series between the seventh LED lamp string and the eighth LED lamp string;
- wherein a sixteenth diode is electrically connected between the seventh LED lamp string and the fifteenth diode;
- wherein a seventeenth diode is electrically connected between the eighth LED lamp string and the fifteenth diode;
- wherein a eighteenth diode is electrically connected between the eighth LED lamp string and the ninth LED lamp string;
- wherein a nineteenth diode is electrically connected between the ninth LED lamp string and the tenth LED lamp string; and
- wherein the first LED lamp string and the tenth LED lamp string are formed by connecting two LEDs in series, the second LED lamp string and the ninth LED lamp string are formed by connecting seven LEDs in series, the third LED lamp string and the eighth LED lamp string are formed by connecting thirty-three LEDs in series, the fourth LED lamp string and the seventh LED lamp string are formed by connecting forty-two LEDs in series, and the fifth LED lamp string and the sixth LED lamp string are formed by connecting twenty-one LEDs in series.

* * * * *